United States Patent [19]

Hwo

[11] Patent Number: 5,066,543
[45] Date of Patent: Nov. 19, 1991

[54] FILM, SHEET AND LAMINATE CAPABLE OF FORMING EASY-OPEN PACKAGINGS

[75] Inventor: Charles C. Hwo, Sugar Land, Tex.

[73] Assignee: Shell Oil Company, Houston, Tex.

[21] Appl. No.: 486,565

[22] Filed: Feb. 28, 1990

[51] Int. Cl.[5] .................. B32B 15/08; B32B 27/28; C08L 23/20; C08L 33/02; C08L 33/04
[52] U.S. Cl. .................................. 428/412; 428/463; 428/476.1; 428/483; 428/513; 428/516; 525/221
[58] Field of Search ............... 525/221; 428/412, 463, 428/476.1, 483, 513, 516

[56] References Cited

U.S. PATENT DOCUMENTS

| 2,480,998 | 9/1949 | Brackett | 241/27 |
| 3,197,452 | 7/1965 | Natta et al. | 260/93.7 |
| 3,819,792 | 6/1974 | Katsuyaono et al. | 26/95 |
| 3,879,492 | 4/1975 | Bontinick | 260/857 D |
| 3,900,534 | 8/1975 | Lyong | 252/273 |
| 4,189,519 | 2/1980 | Ticknor | 428/476.1 |
| 4,346,196 | 8/1982 | Hoh et al. | 428/516 |
| 4,414,053 | 11/1983 | Korim et al. | 525/228 |
| 4,539,263 | 9/1985 | Hoh | 428/500 |
| 4,550,141 | 10/1985 | Hoh et al. | 525/221 |
| 4,835,218 | 5/1989 | Yoshimura et al. | 525/221 |
| 4,870,134 | 9/1989 | Hwo | 428/516 |
| 4,945,005 | 7/1990 | Aleckner | 525/221 |

FOREIGN PATENT DOCUMENTS

| 63-104837 | 5/1988 | Japan | 428/516 |
| 6507546 | 6/1965 | Netherlands . | |

Primary Examiner—Carman J. Seccuro

[57] ABSTRACT

Film or sheets and a laminar structure fabricated from blends of an ethylene-carboxylic acid copolymer, a butene-1 homopolymer or copolymer, and an ethylene homopolymer or an ethylene unsaturated ester copolymer.

15 Claims, No Drawings

FILM, SHEET AND LAMINATE CAPABLE OF FORMING EASY-OPEN PACKAGINGS

BACKGROUND OF THE INVENTION

The present invention relates to a heat sealable wrapping or packing film which is capable of forming a peelable seal having improved hot tack strength. More particularly the inventor relates to film or sheets and a laminar structure fabricated from blends of an ethylene-carboxylic acid copolymer, a butene-1 homopolymer or copolymer, and an ethylene homopolymer or an ethylene unsaturated ester copolymer. The preferred ethylene polymer is ethylene-vinyl acetate copolymer. The seal is achievable either between two films of this kind or between one film of this kind and a rigid container without the need for an adhesive between this film and the container.

A peelable seal is defined to be the seal or joint between two films produced by heat sealing or impulse sealing, the joint thus formed having the property of being able to open in the original plane of joining of the two films by the action of a pulling force, without tearing occurring in the material of the two films used to make up the joint. For the purposes of the present invention, the peelable seal must possess a mechanical resistance sufficient to maintain the wholeness and the tight-seal properties of the packing and wrapping during storage and transport until such time as the packing or wrapping is opened by the user of the article. The mechanical resistance of the peelable seal must be low enough to permit ready manual opening of the joint, i.e., without the use of any auxiliary instrument.

The invention relates to blends, and a method for making a blend usable in a flexible film package. This invention relates to films and/or laminates which are characterized by a nearly constant peel strength over an extended heat seal temperature range and by being peelable. The term peelable refers to a film having seal failure which occurs primarily at the interface of the sealing surface, and not by film tearing. The blends, films, and/or laminates of the present invention permit the manufacture of a more consistent finished product, having a seal of predictable and constant peel strength, in spite of inevitable variations in the heat seal temperatures used in the production of such packages.

In the past, many variations of thermoplastic materials have been employed in the manufacture of films capable of forming peelable seals. See, for example, U.S. Pat. No. 4,189,519, to American Can, which discloses a blend for producing a peelable heat seal comprising (1) about 50 to 90 percent by weight of a copolymer of about 80 to 96 percent by weight ethylene and about 4 to 20 percent by weight of an ethylenically unsaturated ester, and (2) about 10 to 50 percent by weight of a crystalline isotactic polybutylene. While capable of forming a peel seal, the film of 519 discloses polybutylene as a minor component.

U.S. Pat. No. 3,900,534 to Mobil Oil Corporation discloses thermoplastic shrink films with good heat seal characteristics and good optical properties, however, 534 does not address the need for a peel seal film.

U.S. Pat. No. 3,879,492 to UCB S. A. Belgium discloses blends of polybutylene+styrene-butadiene copolymer+LDPE+HDPE+polyiosbutylene.

U.S. Pat. No. 4,539,263 to E. I. DuPont de Nemours & Co. discloses peel seals based on blends of comonomers and propylene/α-olefin copolymer, however, '263 does not provide disclosure directed to polybutylenes.

U.S. patent application Ser. No. 750,342 discloses blends of polybutylene +EVA (or polyethylene)+-polypropylene with polypropylene being less than 15 weight percent in the blend. However, none of these references teaches the novel invention.

A variety of other references teach heat sealable films capable of forming peel seals, such as U.S. Pat. No(s). 4,550,141, 4,539,263, and 4,414,053. However, none of these references appear to teach the components of the film for forming an intimate packaging film structure as disclosed herein. The instant invention recognizes that conventional multilayer peelable seal films or sheets are comprised of substrates and peelable sealants which are generally not chemically compatible and accordingly, the present invention teaches a novel blend, and method of making a film which creates chemically compatible substrates and peelable sealants. The instant invention avoids delamination layers when sealed layers are pulled apart.

There has been a long felt need for a blend to be used as a sealant which has a higher hot tack strength for use in certain applications such as vertical form/fill/seal packaging.

SUMMARY OF THE INVENTION

It has now been found that certain properties including hot tack strength may be improved by fabricating films or sheets from blends having 35 to 90 weight percent of an ethylene homopolymer or an ethylene unsaturated ester copolymer (preferably 45 to 85 weight percent), from about 5 percent by weight to about 55 percent by weight of butene-1 homopolymer or copolymer (preferably 5 to 25 weight percent) and from about 10% to 60% by weight an ethylene carboxylic acid copolymer, preferably 10 to 40 weight percent. Such films or sheets are bonded to a substrate by coextrusion or extrusion lamination.

A new composition of matter for producing a peelable heat seal between substrates on which it is carried, comprising a blend of:
- (a) about 5.0 to about 50.0 weight percent of polybutylene homopolymer or copolymer having a melt index of about 0.01 to about 1000;
- (b) about 35 to about 90 weight percent of an ethylene homopolymer or an ethylene unsaturated ester copolymer;
- (c) 5 to about 50 percent by weight ethylene carboxylic acid copolymer; and wherein film made from said blend, when laminated between backing materials or to a rigid container at a heat sealing temperature of between about 160° F. and about 500° F. as determined at sealing jaws, affords a peel strength of between about 0.4 to about 5 pounds per inch between the backing material and the rigid container.

A laminated film adapted for producing lidding material said film being a laminate of a backing material and a heat sealing blend, said blend comprising:
- (a) about 5.0 to about 50.0 weight percent of polybutylene homopolymer or copolymer having a melt index of about 0.01 to about 1000;
- (b) about 35 to about 90 weight percent of an ethylene homopolymer or an ethylene unsaturated ester copolymer;
- (c) 5 to about 50 percent by weight ethylene carboxylic acid copolymer; and wherein said film has utility for achieving a peel strength of between about 0.4 pounds to about 5 pounds per inch when heat sealing occurs at a temperature in the range between about 160° F. and about 500° F. as determined at the sealing jaws.

A new sealable rigid polymeric package comprising a rigid polymeric container having a lid sealed with a film or laminate containing a heat sealing blend, said blend comprising:
(a) about 5.0 to about 50.0 weight percent of polybutylene homopolymer or copolymer having a melt index of about 0.01 to about 1000;
(b) about 35 to about 90 weight percent of an ethylene homopolymer or an ethylene unsaturated ester copolymer;
(c) 5 to about 50 percent by weight ethylene carboxylic acid copolymer; and wherein said film has utility for achieving a peel strength of between about 0.4 pounds to about 5 pounds per inch when heat sealing occurs at a temperature in the range between about 160° F. and about 500° F. as determined at the sealing jaws.

DETAILED DESCRIPTION OF THE PREFERRED EMBODIMENT

The term ethylene-carboxylic acid copolymer refers to copolymers having the molecular formula:

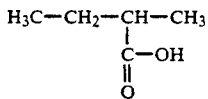

The compounds which come within the scope of this term can include, but are not limited to ethylene acrylic acid (EAA), ethylene methyl acrylic acid (EMAA), ethylene ethyl acrylic acid (EEAA), ethylene butyl acrylic acid (EBAA) and ethylene propyl acrylic acid (EPAA).

The term polybutylene refers to polymers of butene-1 homopolymer and butene-1 copolymers such as butene-1-ethylene, butene-1-propylene, and butene-1-alpha olefins having from 5 to 8 carbon atoms.

The polybutylene which is a basic component of the laminates of this invention is a product of such a stereospecific polymerization procedure and is referred to as an "isotactic" or "stereospecific" polymer in that the repeating units of its polymeric chain all possess the same stereochemical configuration along the chain. This is to be contrasted with "atactic" polymers wherein the repeating units of the polymeric chain vary in a random configuration along the chain. The stereochemical nature of the isotactic polybutylene for use in the present invention may be readily observed from the following structural depiction thereof:

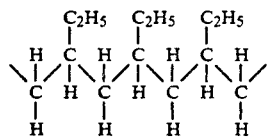

The high molecular weight, isotactic polybutylenes utilized in the novel structures of this invention are prepared by the stereospecific polymerization of monomeric butene-1. Methods for conducting such polymerization procedures are well known to those skilled in the art; typical procedures being disclosed in U.S. Pat. No. 3,197,452, issued July 27, 1965, and in Dutch application No. 6507546, published Dec. 16, 1965. These procedures generally involve the use of polymerization initiators or catalysts for the polymerization of the monomeric butene-1 to polymers of high molecular weight. Among the preferable catalytic systems utilized in such procedures are the reaction products of metal alkyl compounds, such as aluminum triethyl, and a heavy metal compound, such as the trihalides of Groups IV-VI metals in the Periodic Table, e.g. titanium, vanadium, chromium, zirconium, molybdenum and tungsten, etc. The formation of polymers exhibiting substantial isotactic properties as well as the variations in the molecular weight thereof will thus depend on the nature of the polymerization catalyst, the nature of the co-reactants in the system and the reaction conditions being utilized, etc.

The applicable isotactic polybutylenes are relatively rigid while in their plastic form but flow readily upon being heated. As noted, they must exhibit a high molecular weight. Thus, expressing molecular weight in terms of "melt flow," the applicable isotactic polybutylenes should exhibit a melt flow in the range of from 0.2 to 300, and preferably from 0.4 to 40.0. The latter melt flow values are determined by the method described in ASTM D 1236-62 Te and are inversely related to molecular weight, i.e. the lower the melt flow value, the higher the molecular weight. In addition, it should be noted that minor amounts, i.e. up to about 20 percent by weight, of alpha-olefin comonomers, such as ethylene and propylene, may be present in the butene-1 polymerization system without any substantial loss of the herein-described desirable properties displayed by the resultant essentially homopolymeric system.

Therefore, the term polybutylene may refer to polymers of butene-1 homopolymer and butene-1 copolymers such as butene-1-ethylene, butene-1-propylene, and butene-1-alpha olefins having from 5 to 8 carbon atoms.

Butene-1 can be copolymerized with a variety of alpha-olefins to provide useful copolymers such as those taught in U.S. Pat. No. 3,362,940 which is herein incorporated by reference.

The composition of the polybutylene employed herein is preferably of a film-forming grade, and can be obtained commercially from the Shell Chemical Company or prepared as described in U.S. Pat. No. 3,362,940. Preferably, the polybutylene has a melt index in the range of about 0.1 to about 500, and more preferably in the range of about 0.4 to about 7. More preferably, the polybutylene has a melt index of about 1 to about 4. Most preferably, the polybutylene has a melt index of 2±0.5.

The novel polymer mixtures may be formed into an oriented or unoriented film by casting or film blowing method. After fabrication the film can be heat sealed by sealing jaws at a preset temperature, pressure, and dwell. The seal strength is tested by an Instron tensile tester at 10"/min. crosshead speed. Maximum strength on a one inch width strip was designated as peel seal strength.

These manufacturing techniques apply to film, although this invention may also apply to sheeting. Film refers to shaped plastics that are comparatively thin and have a maximum thickness of 0.010 inches (10 mils). Sheeting is a shaped plastic having a thickness greater than 0.010 inches.

The present invention may also comprise the coating layer of a laminated structure which comprises a backing material. The peel seal coat, which consists of a mixture of a ethylene-carboxylic acid copolymer, butene-1 homopolymer or copolymer, and ethylene-vinyl acetate copolymer can be coated or laminated onto a desired backing material. The backing material can be a member of the group consisting of, but not limited to poly-4-methyl pentene nylon, high density polyethylene, aluminum foil, polycarbonate, polystyrene, polyurethane, polyvinyl chloride, polyester, polyacrylonitrile, and polypropylene. Except for high density polyethylene, nylon, and the aluminum foil, the remaining backing material may require a tie layer adhesive for use with the novel film layer.

The laminated structure can be made by making two separate films that are then laminated. The films may be prefabricated by either film blowing (melt extrusion with a circular die) or the casting method (a flat die-melt extrusion process).

The resultant film article can be prepared by any suitable means, such as heat lamination or coextrusion. Coextrusion techniques that can be used for the preparation of the instant film include those described in detail in U.S. Pat. No. 2,480,998.

Melt extrusion with a flat die (casting) may be accomplished for thermoplastic polymers by using a flat die or slot die. The extrusion process starts with a polymer in a form that can be fed continuously into an extruder by means of a screw or pneumatic tube. Sometimes the polymers are combined with materials such as plasticizers, lubricants, stabilizers, and colorants by means of Banbury mixers. The resulting mix is extruded through rod shaped dies and chipped into pellets. Pelletized polymer is fed into a screw conveyor into the end of screw-type extruder and is heated and made into viscous fluid in a cylinder by means of a revolving, helical screw. The sheet emitting from the die is quenched on a temperature controlled chill roll. Finished films may be subject to a two-way stretching using continuous tenterframe operations in biaxially orientation.

EXAMPLE 1

BLOWN FILM

DURAFLEX ® Polybutylene PBO110, obtainable from Shell Chemical Company, having a melt index of about 0.4 dg/mins. (ASTM method D-1238 condition "E") and a density of about 0.9 was dry blended in a tumbler mixer with Dow Primacor 1430 ethylene-acrylic acid copolymer and DuPont Alathon ® 3159 ethylene-vinyl acetate. The resultant blend was coextruded with Hoechst-Celanese 7740 high density polyethylene (HDPE) at a die temperature of about 210° C. into film of about 2.5 mils in thickness using a flat die. The film comprised 2.0 mils of HDPE and 0.5 mils of the remaining components. Hot tack strength was tested. Film samples of each composition 1 inch wide and 12 inches long were tested at temperatures between 170° F. and 250° F. Hot tack strength was determined using a DTC Hot Tack Tester using 40 psi seal bar pressure, 150 mm/sec peel speed, 0.5 seconds dwell time and 0.3 seconds delay time setting. Hot tack strengths are given for the films in Table 1.

TABLE 1

| TEMP. °F. | HOT TACK STRENGTH (N/INCH) | | | | | | |
|---|---|---|---|---|---|---|---|
| | 1 | 2 | 3 | 4 | 5 | AVG. | STD. |
| Blend of 85 w % EVA and 15 w % PB (Control) | | | | | | | |
| 170 | 0.1 | 0.1 | 0.1 | 0.1 | 0.1 | 0.1 | 0.00 |
| 180 | 1.8 | 1.8 | 1.7 | 1.8 | 1.6 | 1.74 | 0.08 |
| 190 | 1.9 | 1.9 | 1.6 | 1.7 | 1.7 | 1.76 | 0.12 |
| 200 | 1.2 | 1.2 | 1.3 | 1.5 | 1.5 | 1.34 | 0.14 |
| 210 | 1.1 | 1.2 | 0.9 | 0.9 | 1.1 | 1.04 | 0.12 |
| 220 | 1.1 | 0.9 | 0.9 | 1 | 1 | 0.98 | 0.07 |
| 230 | 0.6 | 0.7 | 0.6 | 0.9 | 0.7 | 0.7 | 0.11 |
| 240 | 0.7 | 0.7 | 0.7 | 0.7 | 0.7 | 0.7 | 0.00 |
| 250 | 0.4 | 0.7 | 0.5 | 0.6 | 0.4 | 0.52 | 0.12 |
| Blend of 65 w % EVA, 15 w % PB and 20 w % EAA | | | | | | | |
| 170 | 0.3 | 0.3 | 0.3 | 0.3 | 0.3 | 0.3 | 0.00 |
| 180 | 2.7 | 2.7 | 2.5 | 2.4 | 2.7 | 2.6 | 0.13 |
| 190 | 1.8 | 1.7 | 2.1 | 1.8 | 1.9 | 1.86 | 0.14 |
| 200 | 1.9 | 1.9 | 1.8 | 1.9 | 2 | 1.9 | 0.06 |
| 210 | 1.4 | 1.4 | 1.2 | 1.1 | 1.6 | 1.34 | 0.17 |
| 220 | 1.7 | 1.6 | 1.6 | 1.6 | 1.6 | 1.62 | 0.04 |
| 230 | 1.3 | 1.3 | 1.3 | 1.3 | 1.2 | 1.28 | 0.04 |
| 240 | 1.1 | 1 | 1 | 0.8 | 0.8 | 0.94 | 0.12 |
| 250 | 0.8 | 0.7 | 0.7 | 0.6 | 0.6 | 0.68 | 0.07 |
| Blend of 45 w % EVA, 15 w % PB and 40 w % EAA | | | | | | | |
| 170 | 0 | 0 | 0.1 | 0.1 | 0.1 | 0.06 | 0.05 |
| 180 | 1.8 | 1.4 | 1.4 | 1.7 | 1.9 | 1.64 | 0.21 |
| 190 | 3.1 | 3.3 | 3.2 | 3 | 2.4 | 3 | 0.32 |
| 200 | 2.8 | 2.7 | 2.7 | 2.2 | 2.5 | 2.58 | 0.21 |
| 210 | 2.7 | 2.6 | 2.5 | 2.5 | 2.6 | 2.58 | 0.07 |
| 220 | 2.2 | 2.2 | 2 | 2.2 | 2 | 2.12 | 0.10 |
| 230 | 2.1 | 1.7 | 1.9 | 1.8 | 2 | 1.9 | 0.14 |
| 240 | 0.9 | 1 | 1.1 | 1 | 1.2 | 1.04 | 0.10 |
| 250 | 1.8 | 1.6 | 1.7 | 1.7 | 1.6 | 1.68 | 0.07 |

As may be seen from Table 1, the film was tested for hot tack strength in Newtons per inch at sealing temperatures of from 170° F. to 250° F. From the example, it has been unexpectedly found that the mixture containing an ethylene-carboxylic acid copolymer, in particular EAA, when blown results in a unique film which as a higher hot tack strength, good processability (does not adhere to the processing equipment), and will bond by coextrusion or extrusion lamination to a high density polyethylene substrate in a laminar structure without the need for an adhesive to achieve such bonding. Increases in hot tack strength of 100% or more over the blend without EAA were easily obtainable.

What is claimed is:

1. A packaging film or sheet which is capable of forming peel seals, comprising a blend of:
   from about 35 percent by weight to about 90 percent by weight of an ethylene unsaturated ester copolymer;
   from about 10 percent by weight to about 60 percent by weight of an ethylene-carboxylic acid copolymer; and
   from about 5 percent by weight to about 55 percent by weight of a butene-1 homopolymer or copolymer.

2. The packaging film or sheet of claim 1 which consists of:
   from about 45 percent by weight to about 85 percent by weight of said ethylene unsaturated ester copolymer;
   from about 20 percent by weight to about 50 percent by weight of said ethylene-carboxylic acid copolymer; and
   from about 10 percent by weight to about 40 percent by weight of said butene-1 homopolymer or copolymer.

3. The packaging film or sheet of claim 1 which consists of:

from about 55 percent by weight to about 75 percent by weight of said ethylene unsaturated ester copolymer;

from about 25 percent by weight to about 45 percent by weight of said ethylene-carboxylic acid copolymer; and from about 10 percent by weight to about 20 percent by weight of said butene-1 homopolymer or copolymer.

4. The packaging film or sheet of claim 1, wherein said ethylene-carboxylic acid copolymer is selected from the group consisting of:

ethylene acrylic acid (EAA), ethylene methyl acrylic acid (EMAA), ethylene ethyl acrylic acid (EEAA), ethylene butyl acrylic acid (EBAA), and ethylene propyl acrylic acid (EPAA).

5. The packaging film or sheet of claim 1 which comprises an unoriented or oriented film.

6. A blend for producing a packaging film which is capable of forming peel seals comprising:

from about 35 percent by weight to about 90 percent by weight of an ethylene unsaturated ester copolymer;

from about 10 percent by weight to about 60 percent by weight of an ethylene-carboxylic acid copolymer; and from about 5 percent by weight to about 55 percent by weight of a butene-1 homopolymer or copolymer.

7. The blend of claim 6 which consists of:

from about 45 percent by weight to about 85 percent by weight of said ethylene unsaturated ester copolymer;

from about 20 percent by weight to about 50 percent by weight of said ethylene-carboxylic acid copolymer; and from about 10 percent by weight to about 40 percent by weight of said butene-1 homopolymer or copolymer.

8. The blend of claim 6 which consists of:

from about 55 percent by weight to about 75 percent by weight of said ethylene unsaturated ester copolymer;

from about 25 percent by weight to about 45 percent by weight of said ethylene-carboxylic acid copolymer; and from about 10 percent by weight to about 20 percent by weight of said butene-1 homopolymer or copolymer.

9. The blend of claim 6 wherein said ethylene-carboxylic acid copolymer is selected from the group consisting of:

ethylene acrylic acid (EAA), ethylene methyl acrylic acid (EMAA), ethylene ethyl acrylic acid (EEAA), ethylene butyl acrylic acid (EBAA), and ethylene propyl acrylic acid (EPAA).

10. A laminar structure comprising a backing material to which is bonded a film or sheet, which is capable of forming peel seals, comprising:

from about 35 percent by weight to about 90 percent by weight of an ethylene unsaturated ester copolymer;

from about 10 percent by weight to about 60 percent by weight of an ethylene-carboxylic acid copolymer; and from about 5 percent by weight to about 55 percent by weight of a butene-1 homopolymer or copolymer.

11. The laminar structure of claim 10 which consists of:

from about 45 percent by weight to about 85 percent by weight of said ethylene unsaturated ester copolymer;

from about 20 percent by weight to about 50 percent by weight of said ethylene-carboxylic acid copolymer; and from about 10 percent by weight to about 40 percent by weight of said butene-1 homopolymer or copolymer.

12. The laminar structure of claim 10 which consists of:

from about 55 percent by weight to about 75 percent by weight of said ethylene unsaturated ester copolymer;

from about 20 percent by weight to about 45 percent by weight of said ethylene-carboxylic acid copolymer; and from about 10 percent by weight to about 20 percent by weight of said butene-1 homopolymer or copolymer.

13. The laminar structure of claim 10, wherein said ethylene-carboxylic acid copolymer is selected from the group consisting of:

ethylene acrylic acid (EAA), ethylene methyl acrylic acid (EMAA), ethylene ethyl acrylic acid (EEAA), ethylene butyl acrylic acid (EBAA), and ethylene propyl acrylic acid (EPAA).

14. The laminar structure of claim 10, wherein said film or sheet is unoriented or oriented.

15. The laminar structure of claim 10, wherein said backing material is selected from the group consisting of polypropylene film, aluminum foil, nylon film, polyester film, polycarbonate film, poly-4-methyl pentent-1 film, and paper.

* * * * *